United States Patent
Kalevo et al.

(10) Patent No.: US 6,724,944 B1
(45) Date of Patent: Apr. 20, 2004

(54) ADAPTIVE FILTER

(75) Inventors: Ossi Kalevo, Tampere (FI); Marta Karczewicz, Tampere (FI)

(73) Assignee: Nokia Mobile Phones, Ltd., Espoo (FI)

( * ) Notice: Subject to any disclaimer, the term of this patent is extended or adjusted under 35 U.S.C. 154(b) by 0 days.

(21) Appl. No.: 09/380,918

(22) PCT Filed: Mar. 12, 1998

(86) PCT No.: PCT/FI98/00219

§ 371 (c)(1), (2), (4) Date: Jan. 18, 2000

(87) PCT Pub. No.: WO98/41025

PCT Pub. Date: Sep. 17, 1998

(30) Foreign Application Priority Data

Mar. 13, 1997 (FI) .................................................. 971060

(51) Int. Cl.$^7$ .............................. G06T 5/00; G06T 7/00; H03M 13/00
(52) U.S. Cl. .................... 382/268; 382/261; 375/240.29
(58) Field of Search ................................. 382/268, 260, 382/261, 262, 264, 275, 199, 251; 375/240.24, 240.26, 240.27, 240.29

(56) References Cited

U.S. PATENT DOCUMENTS

| | | | |
|---|---|---|---|
| 4,816,914 A | 3/1989 | Ericsson | |
| 4,941,043 A | 7/1990 | Jass | |
| 5,229,864 A * | 7/1993 | Moronaga et al. | 382/261 |
| 5,337,088 A | 8/1994 | Honjo | 375/240.24 |
| 5,367,385 A | 11/1994 | Yuan | 382/264 |
| 5,454,051 A | 9/1995 | Smith | |
| 5,568,196 A | 10/1996 | Hamada et al. | |
| 5,579,051 A | 11/1996 | Murakami et al. | |
| 5,696,851 A | 12/1997 | Rao | 382/266 |
| 5,949,917 A * | 9/1999 | Kawasaka | 382/268 |
| 6,041,145 A * | 3/2000 | Hayashi et al. | 382/268 |
| 6,144,700 A * | 11/2000 | Kim | 382/251 |
| 6,167,164 A * | 12/2000 | Lee | 382/261 |
| 6,175,596 B1 * | 1/2001 | Kobayashi et al. | 382/275 |
| 6,188,799 B1 * | 2/2001 | Tan et al. | 382/260 |
| 6,236,764 B1 * | 5/2001 | Zhou | 382/268 |
| 6,285,801 B1 * | 9/2001 | Mancuso et al. | 382/268 |
| 6,504,873 B1 * | 1/2003 | Vehvilainen | 375/240.29 |
| 6,529,638 B1 * | 3/2003 | Westerman | 382/275 |

FOREIGN PATENT DOCUMENTS

| | | |
|---|---|---|
| DE | 40 17 375 A1 | 12/1991 |
| DE | 41 28 977 A1 | 3/1993 |
| EP | 0 571 171 A3 | 11/1993 |
| EP | 0902592 A2 | 3/1999 |
| WO | WO 91/14340 | 9/1991 |
| WO | WO 96/42165 | 12/1996 |

OTHER PUBLICATIONS

PCT International Search Report.
Patent Abstracts of Japan; Publication No. 08265762; Publication Date Oct. 11, 1996.

* cited by examiner

Primary Examiner—Scott Rogers
(74) Attorney, Agent, or Firm—Perman & Green, LLP

(57) ABSTRACT

In order to remove blocking artifacts from a frame which has been coded by blocks and then decoded, a certain number of pixels (n) is selected for examination from both sides of the block boundary (30). The number of pixels selected for examination depends on the image content of the frame in the environment of the block boundary, particularly on the difference of the pixel values across the block boundary (30) and the size of the quantization step of the transformation coefficients used in the transformation coding of the blocks.

13 Claims, 5 Drawing Sheets

ADAPTIVE FILTER

TECHNOLOGICAL FIELD

The invention relates to the processing of a digital video image in general. In particular, the invention relates to removing image errors caused by block boundaries in connection with the decoding of a coded video image.

BACKGROUND OF THE INVENTION

An arrangement like the one shown in FIG. 1 is generally used for transferring a digital video image in compressed form. The video image is formed of sequential frames. The current frame comes to the transmission system 10 as input data $I_n(x,y)$. In the differential summer 11 it is transformed into a differential frame $E_n(x,y)$ by subtracting from it a prediction frame $P_n(x,y)$ formed on the basis of previous images. The differential frame is coded in block 12 in the manner described hereinafter, and the coded differential frame is directed to the multiplexer 13. For forming a new prediction frame, the coded differential frame is also directed to the decoder 14, which produces a decoded differential frame $\hat{E}_n(x,y)$ which is summed in the summer 15 with the prediction frame $P_n(x,y)$, resulting in a decoded frame $\hat{I}_n(x,y)$. It is saved in the frame memory 16. For coding the next frame, the frame saved in the frame memory is read as a reference frame $R_n(x,y)$ and in the motion compensation and prediction block 17 it is transformed into a new prediction frame according to the formula $$P_n(x,y)=R_n[x+\Delta x(x,y), y+\Delta y(x,y)] \quad (1)$$

The pair of numbers $[\Delta x(x,y), \Delta y(x,y)]$ is called the motion vector of the pixel at location $(x,y)$ and the numbers $\Delta x(x,y)$ and $\Delta y(x,y)$ are the horizontal and vertical shifts of the pixel. They are calculated in the motion estimation block 18 and the motion information coding block 19. The set of motion vectors $[\Delta x(\cdot), \Delta y(\cdot)]$ consisting of all motion vectors related to the pixels of the frame to be compressed is also directed to the multiplexer 13, which multiplexes it into the same data stream with a coded differential frame for sending to a receiver. Some frames can be partly or entirely so difficult to predict that it is not practical to use prediction when coding them. These frames or parts of frames are coded using so-called intracoding without prediction, and motion vector information relating to them is not sent to the receiver.

In the receiver 20, the demultiplexer 21 separates the coded differential frames and the motion information transmitted by the motion vectors and directs the coded differential frames to the decoder 22, which produces a decoded differential frame $\hat{E}_n(x,y)$, which is summed in the summer 23 with the prediction frame $P_n(x,y)$ formed on the basis of previous frames, resulting in a decoded frame $\hat{I}_n(x,y)$. It is directed to the output 24 of the reception decoder and at the same time saved in the frame memory 25. For decoding the next frame, the frame saved in the frame memory is read as a reference frame and transformed into a new prediction frame in the motion compensation and prediction block 26, according to the formula (1) presented above.

The coding method which is applied in block 12 to the coding of the differential frame or to the intracoding of a frame or part of it to be sent without prediction, is generally based on a transformation, the most common of which is Discrete Cosine Transformation, DCT. The frame is divided into adjacent blocks sized e.g. 8×8 pixels. In coding and decoding, the blocks are processed independent of one another. The transformation is calculated for the block to be coded, resulting in a series of terms dependent on a certain variable. The coefficients of these terms are quantized on a discrete scale in order that they can be processed digitally. Quantization causes rounding errors, which can become visible in an image reconstructed from blocks so that there is a discontinuity of pixel values at the boundary of two adjacent blocks. Because a certain decoded frame is used for calculating the prediction frame for the next frames, the errors can be repeated in sequential frames, thus causing visible edges in the image reproduced by the receiver. Image errors like this are called blocking artifacts.

Some prior art methods are known for removing the blocking artifacts. These methods are characterized by the following features:

- determining which pixel requires value correction for removing the blocking artefact,
- determining a suitable low-pass filtering for each pixel to be corrected, based on the values of other pixels contained by the filtering window placed around the pixel,
- calculating a new value for the pixel to be corrected, and
- rounding the new value to the closest digitized tonal value.

Factors that influence the selection of a filter and a decision to introduce a filter can be, for example, the difference between the values of pixels across the block boundary, the size of the quantization step of the coefficients received as the transformation result, and the difference of the pixel values on different sides of the pixel being processed.

It has been found that the prior art methods also tend to remove lines of the image that should really be part of it. On the other hand, the prior art methods are not always capable of removing all blocking artifacts.

SUMMARY OF THE INVENTION

The objective of the present invention is to present a new kind of filtering arrangement for removing the blocking artifacts. The invention also has the objective that the method and device according to it operate more reliably and efficiently than the prior art solutions.

The objectives of the invention are achieved by adapting the selection of pixels for filtering and the filtering process more flexibly than before to the features of the frame and the environment of the filtering point.

The method according to the invention for removing blocking artifacts from a frame that has been coded by blocks and decoded after that, in which method a certain number of pixels from both sides of the block boundary are selected for examination, is characterized in that the number of pixels selected for examination depends on the image content of the frame in the environment of the block boundary.

The invention also relates to a device for implementing the method according to the invention. The device according to the invention is characterized in that it comprises means that operate adaptively according to the image content of the frame for selecting the pixels for examination and filtering.

Because blocking artifacts only occur at block boundaries, the filtering according to the invention is only focused on pixels at block boundaries and the immediate vicinity thereof. Edges that are part of the image can be anywhere in the image area. In order that only pixels containing blocking artefacts would be selected for correction and that the quality of edges that are part of the image would not be deteriorated during filtering, the following assumptions have been made in the study that resulted in the invention:

in edges that are part of the image, the tonal value change is generally larger than in blocking artifacts, and the real image edges in which the tonal value change is small do not suffer considerably from the rounding of the tonal value difference by filtering.

Because the image to be coded is generally divided into blocks both vertically and horizontally, the image contains both vertical and horizontal block boundaries. With regard to vertical block boundaries, there are pixels to the right and left of the boundary, and with regard to the horizontal block boundary, there are pixels above and below the boundary. In general, the location of the pixels can be described as being on the first and second side of the block boundary. In the filtering according to the invention, the number of pixels to be corrected, the characteristic features of the filter being used and the size of the filtering window depend on the following factors:

a) the difference of the pixel values $\Delta$ across the block boundary (the difference can be defined in many ways; one definition is $\Delta = |r_1 - l_1|$, where $r_1$ is the value of the pixel on the first side of the block boundary closest to the boundary, and $l_1$ is the value of the pixel on the second side of the block boundary closest to the boundary), b) the size of the quantization step QP of the coefficients received as the result of the transformation used in the coding, and c) the differences of the pixel values between the pixels on the first side of the block boundary, and correspondingly between the pixels on the second side of the block boundary.

In the method and device according to the invention, the number of the pixels to be selected for filtering can vary, and it is not necessarily the same on different sides of the block boundary. Because the number of pixels is adapted according to the factors mentioned above to the general features of the image information contained by the frame in the domain in question, the method is more reliable than the prior art methods. A larger number of blocking artifacts can be removed without weakening the real image edges unreasonably.

BRIEF DESCRIPTION OF DRAWINGS

In the following, the invention will be described in more detail with reference to the preferred embodiments and the accompanying drawings, in which.

Figure 1:
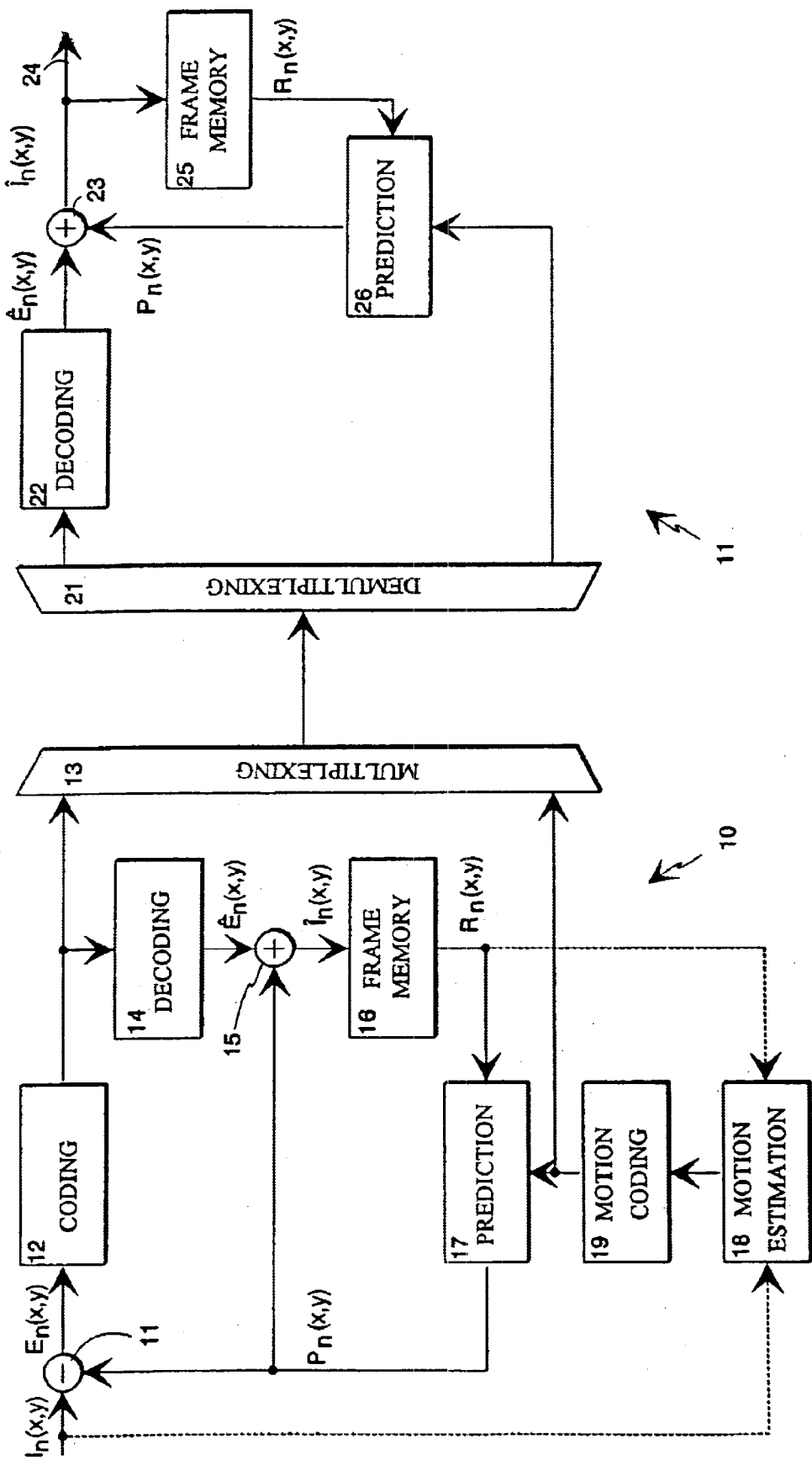
FIG. 1 represents a prior art video image transfer arrangement.

In the above, in connection with the description of the prior art, reference was made to FIG. 1, and so in the following description of the invention and its preferred embodiments, reference will be made mostly to FIGS. 2 to 5. The same reference numbers are used for corresponding parts in the figures.

DETAILED DESCRIPTION OF THE INVENTION

Figure 2:
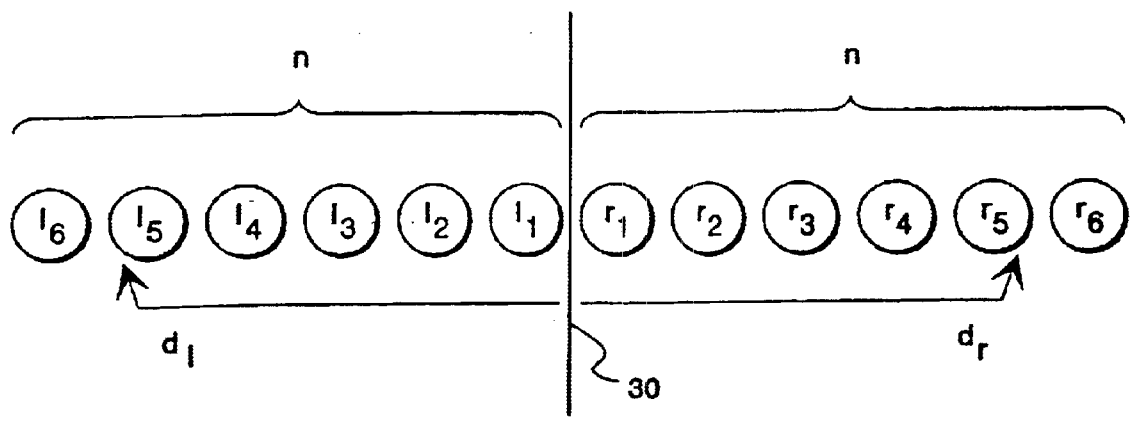
FIG. 2 represents the location of pixels in relation to the block boundary in the method according to the invention.

FIG. 2 shows the location of the pixels $r_1$–$r_6$ and $l_1$–$l_6$ in relation to the vertical block boundary 30. For implementing the method according to the invention, certain parameters must be specified at first. The parameter n is the largest number of pixels to be examined from the block boundary to one direction, and its value is 6 in the case of FIG. 2. It is practical to select the value of the parameter n so that it has a certain relation to both the difference of the pixel values $\Delta$ across the block boundary and to the size of the quantization step QP of the coefficients received as the result of the coding. The following definition is recommended for use here:

$$n = \begin{cases} 0 & \Delta \geq 2.00\alpha \\ 1 & 1.50\alpha \leq \Delta < 2.00\alpha \\ 2 & 1.00\alpha \leq \Delta < 1.50\alpha \\ 3 & 0.66\alpha \leq \Delta < 1.00\alpha, \\ 4 & 0.40\alpha \leq \Delta < 0.66\alpha \\ 5 & 0.25\alpha \leq \Delta < 0.40\alpha \\ 6 & 0 \leq \Delta < 0.25\alpha \end{cases} \quad (2)$$

wherein $\alpha = QP \cdot \log(QP)$. If QP has a different value in blocks on different sides of the block boundary, the smaller value of QP is used in calculation, as well as in all cases presented hereinafter, in which a definition includes reference to one QP value only. The invention does not limit the determination of the value of parameter n, but according to the guidelines of the definition (2) it is advantageous that its value is generally higher when the difference of pixel values $\Delta$ across the block boundary is small in comparison to the size of the quantization step QP of the coefficients received as the result of the coding transformation. If the difference between the pixel values $\Delta$ is very large, there is probably a real image edge at the block boundary, and the pixels are not examined at this point for filtering at all (n=0).

The next step is to determine the values of the parameters $d_l$ and $d_r$, which represent activity, or the differences of pixel values betweel pixels on one side of the block boundary. For the parameter $d_r$, one preferred definition is the following:

$d_r = 6$, if $|r_r - r_j| \leq \beta/j$ with all $j \in [1,6]$, otherwise: $d_r = i$, where i must meet the conditions $i \in [1,n]$, (3)

$|r_r - r_{i-1}| > \beta/i$, and $|r_r - r_j| \leq \beta/j$ with all $j \in [1,i]$.

Here the auxiliary parameter $\beta = 4 \cdot \log(QP)$. The value of the parameter $d_l$ is determined similarly, except that all r's are replaced by l's. The number 6 occurring in the definition (3) is the result of the fact that the highest possible value of n is 6 according to the definition (2). If n is defined differently, but the parameters dr and $d_l$ are defined according to definition (3), the number 6 must be replaced by the highest possible value of n according to the new definition.

With regard to the invention, it is advantageous that the values of the parameters $d_r$ and $d_l$ are calculated independent of one another, because the image information contained by the frame can be different on different sides of the block boundary.

The invention does not limit the definition of parameters $d_r$ and $d_l$, but according to the guidelines of the definition (3) it is advantageous that these parameters are used to limit the blocking artefact processing relatively close to the block boundary, if there is a real image edge beside the block boundary. The essential features of the definition (3) can be described so that the value of parameter dr (and correspondingly the value of parameter $d_l$) tells how many pixels counted from the block edge have approximately the same value as the pixel at the block edge.

A high value of parameter n (e.g. 6) tells that the difference between the pixel values at the block boundary is relatively small as compared to the general variation of the pixel values in the block area. In this case, it is possible that there is a real image edge just beside the block boundary. By selecting a sufficiently small value of parameter $d_r$ (or $d_l$), it is possible to restrict the filtering aimed at correcting blocking artefacts so that it does not have a deteriorating effect on a real image edge close to the block boundary. In some situations, a large number of pixels counted from the block edge have approximately the same value as the pixel at the block edge. In that case, the definition (3) would give the parameter $d_r$ or ($d_l$) a relatively high value, but if there is a clear leap of pixel values between the blocks, the small value of the parameter n due to this and the reference to the value of n in the definition (3) make sure that an unreasonably high value is not selected as the value of the parameter $d_r$ (or $d_l$), which would result in unnecessary filtering.

In addition, the largest possible number of pixels to be filtered must be decided. This does not have a notation of its own in FIG. 2, but it can be e.g. 3, which means that filtering can only be used to correct the value of the pixels $r_1$, $r_2$, $r_3$, $l_1$, $l_2$ and $l_3$.

When the values of the parameters n, $d_r$ and $d_l$ have been determined, filtering is carried out using a suitable filter. The invention does not set limits to the kind of filter to be used, but a filtering arrangement that has been found preferable, will be described in the following. Filtering is used to determine a new value for the pixels selected for filtering. For the new value of the pixel being filtered at a given instant, the mean value of the pixels that appear in the filtering window is calculated. In this case, the filtering window is symmetrical with regard to the pixel to be filtered and contains, in addition to the pixel to be filtered, one, two or three pixels from its both sides, depending on the values of the parameters $d_r$ and $d_l$ as described hereinafter. The calculated mean value is rounded to the closest digitized tonal value, whereby it becomes the new value of the filtered pixel.

The following table shows the determination of the width of the filtering window for the pixels $r_1$, $r_2$ and $r_3$ according to the value of the parameter $d_r$. The values of the pixels $l_1$, $l_2$ and $l_3$ are determined in the same manner according to the value of the parameter $d_l$. In the table, X means that the pixel in question is not filtered at all, and the number means that the filtering window includes a quantity of pixels shown by the number from each side of the pixel being examined. Among other things, the table shows that for the filtering to be focused on any pixel, the parameters $d_r$ and $d_l$ must both have a value higher than 1.

| $d_r$ ($d_l$ > 1) | $r_1$ | $r_2$ | $r_3$ |
|---|---|---|---|
| 1 | X | X | X |
| 2 | 1 | X | X |

| $d_r$ ($d_l$ > 1) | $r_1$ | $r_2$ | $r_3$ |
|---|---|---|---|
| 3 | 1 | 1* | X |
| 4 | 2 | 2 | X |
| 5 | 2 | 2 | 2** |
| 6 | 3 or 2*** | 3 | 3 |

*the filtered value of pixel $r_1$ is used for filtering of pixel $r_2$
**the filtered values of pixels $r_1$ and $r_2$ are used for filtering the pixel $r_3$
***3 if $d_1$ > 2, otherwise 2.

The above description relates to implementing the filtering on one horizontal part of a pixel row, which part is 12 pixels long and located symmetrically on both sides of a vertical block boundary. The description can be easily generalized to concern vertical parts of pixel columns, which are located symmetrically on both sides of a horizontal block boundary: FIG. 2 can be turned 90 degrees counter-clockwise, whereby the block boundary 30 is horizontal, and the pixels shown in the figure form part of the vertical pixel column so that pixels $r_1$–$r_6$ are the pixels above and pixels $l_1$–$l_6$ are the pixels below. For filtering the whole frame with the method according to the invention, all vertical block boundaries of the frame are examined row by row and all its horizontal block boundaries column by column. The order has no significance at such, and thus all the horizontal block boundaries of the frame could be examined first column by column, and then all the vertical block boundaries row by row.

Figure 3:
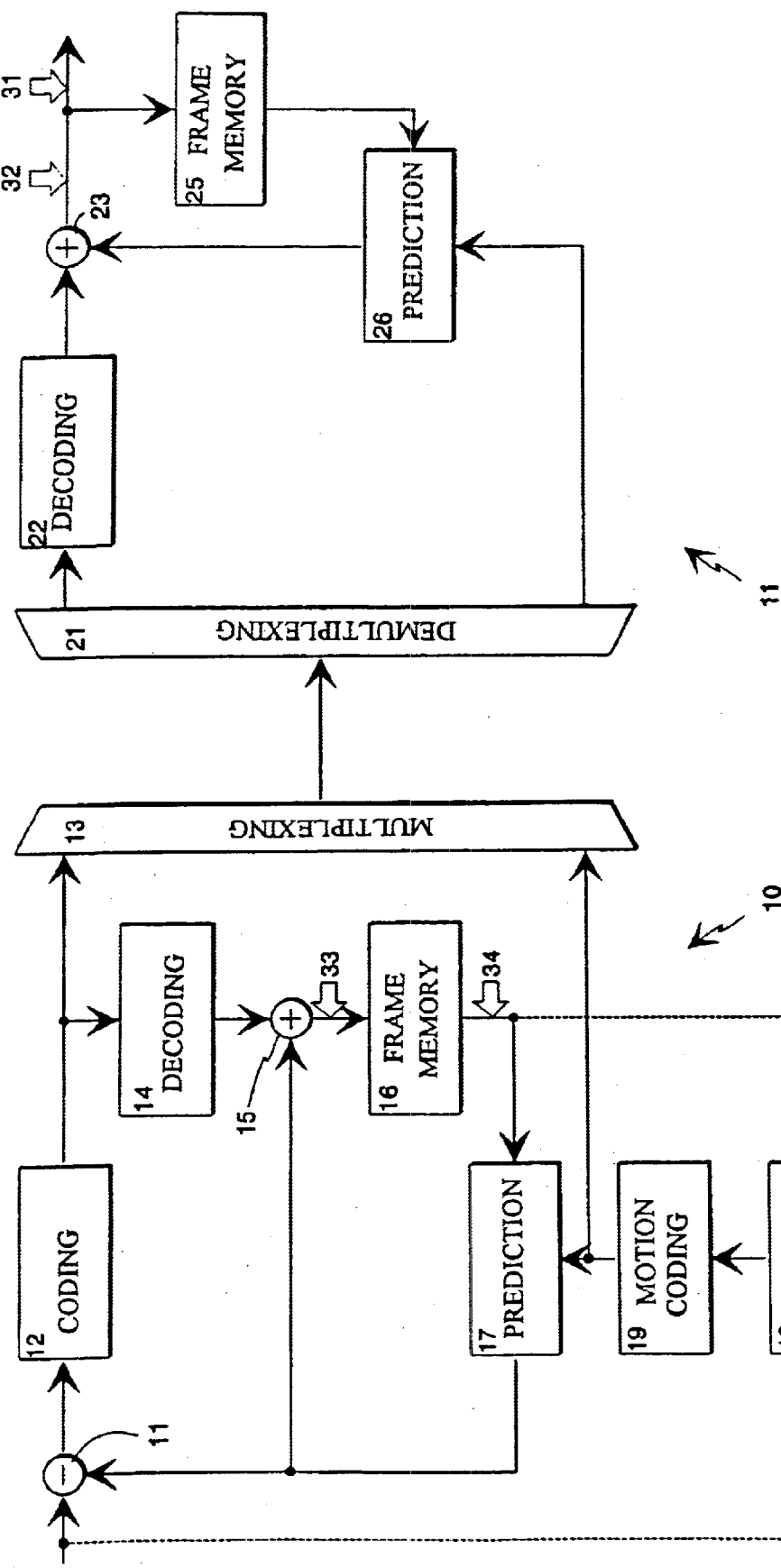
FIG. 3 represents alternatives for locating the filtering according to the invention in a video image transfer arrangement.
Figure 4:
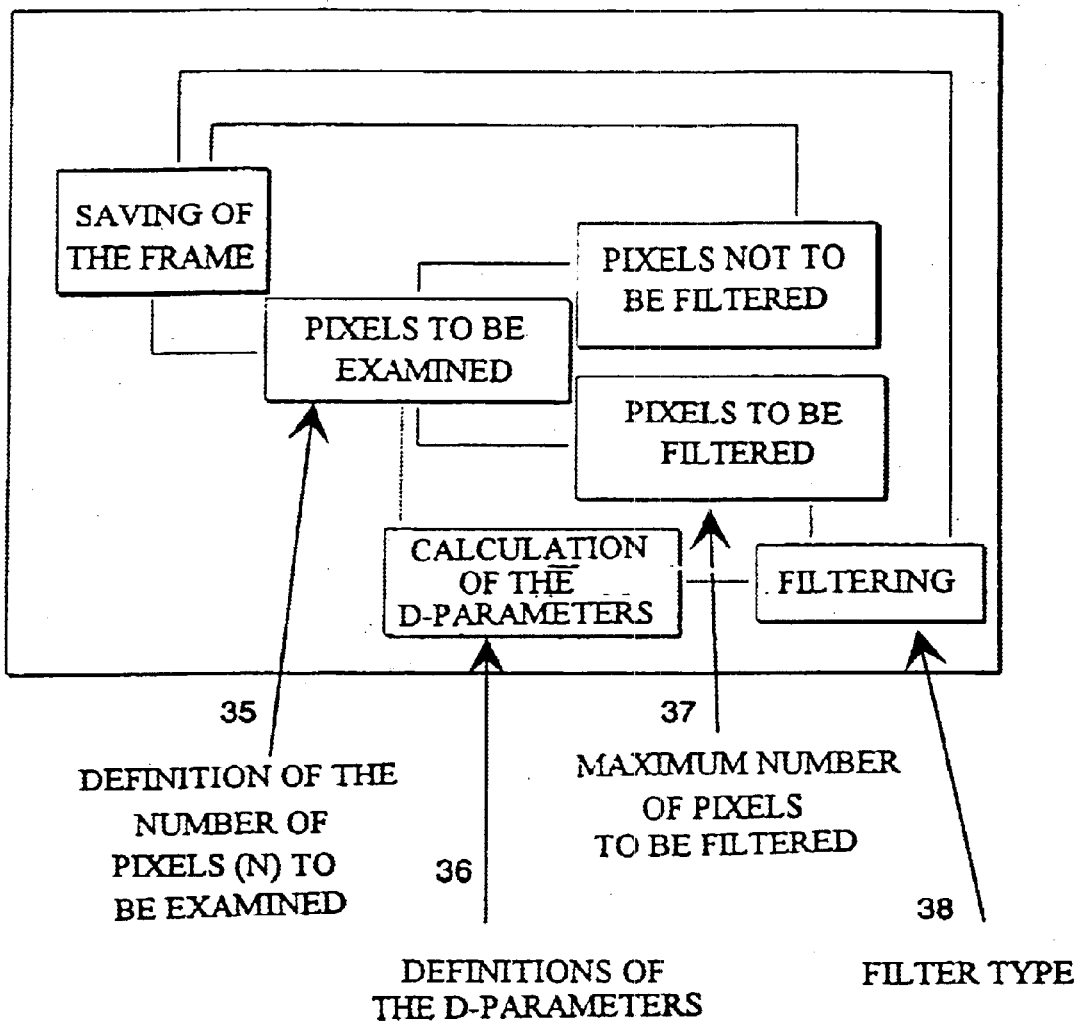
FIG. 4 represents schematically a device for implementing a method according to the invention.
Figure 5:
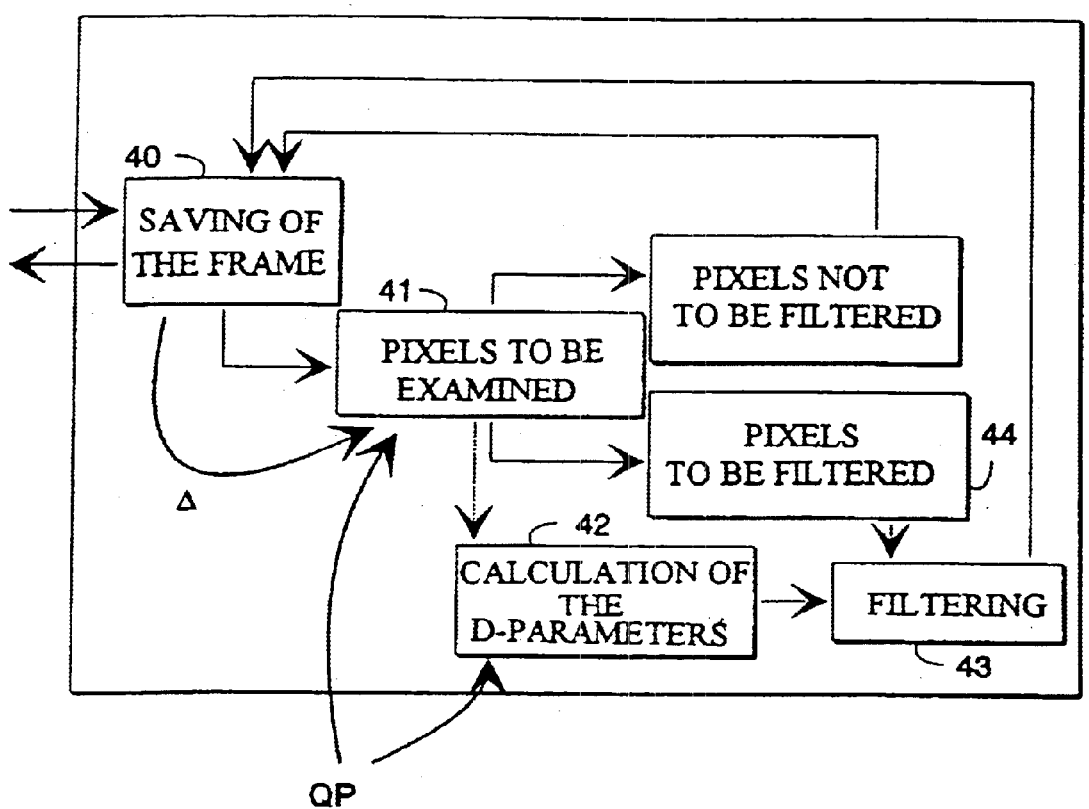
FIG. 5 represents a device according to FIG. 4 in operation.

FIG. 3 shows at which points the prior art image transfer arrangement can be improved by filtering according to the invention. The first alternative is to place the block implementing the filtering according to the invention in the output of the decoder of the receiver as illustrated by reference number 31. In this case, only the video image being directed out during decoding is filtered. Another alternative is to place the block carrying out the filtering according to the invention in the receiver before the point at which the decoded frame is directed to the frame memory 25 for forming a prediction frame, as illustrated by reference number 32. This alternative has the advantage that the removal of blocking artifacts also has an effect on the formation of a prediction frame, whereby the lines possibly caused by blocking artefacts and seen by the naked eye are not duplicated via the prediction frame to the next frames. In order to achieve the last mentioned effect, the block carrying out the filtering according to the invention can also be placed before the frame memory 25 or after it, but the location shown by reference number 32 is preferred, because when done at this stage, the filtering influences simultaneously the frame to be directed out and the frame to be saved in the memory. In the transmitter, the block carrying out the filtering according to the invention can be placed as shown by reference numbers 33 and 34 before the frame memory 16 or after it, if it is desired that the invention is also applied to producing a corrected prediction frame at the transmission end.

The block carrying out the filtering according to the invention is particularly advantageously implemented in a digital signal prosessor or a corresponding device suited for processing a digital signal, which can be programmed to focus predetermined processing functions to the signal received as input data. At the programming stage of the digital signal processor, the definitions 35–38 are saved according to FIG. 4 for calculating the parameters that control filtering. At the operation step according to FIG. 5, the frame is saved temporarily in the register 40, so that it can be processed in the signal processor pixel by pixel. A number of pixels indicated by the parameter n are selected from the frame as the pixels to be examined 41 at a given instant from each side of a certain point of a certain block boundary, the d-parameters 42 are calculated, filtering 43 is done, and these measures are repeated, until all boundaries of all blocks have been gone through, after which the frame can be fed out of the register 40 and a new frame saved for processing. The measures according to FIGS. 4 and 5 can be carried out in a separate signal processor or they can be part of the operation of such a signal processor which also contains other arrangements for signal processing.

The invention can be modified without departing from the scope defined by the claims hereinafter, using the capabilities of a person skilled in the art without actual inventive steps. For example, the parameter $\Delta$ can be calculated using the formula $\Delta = |(r_1 + r_2) - (l_1 + l_2)|$ or some other formula regarded as suitable. The definitions of other parameters above have also been intended as examples only. A particularly advantageous use of the invention is in digital television receivers and other devices that receive and decode digital video image.

What is claimed is:

1. A method for removing blocking artifacts from a frame of a digital video signal which has been coded by blocks and then decoded, comprising the steps of analyzing the image content of the frame in the environment of a block boundary, selecting a certain number of pixels for examination from both sides of said block boundary, wherein the number of pixels selected for examination depends on the analyzed image content of the frame in the environment of said block boundary, and using filtering to correct the value of at least part of the pixels selected for examination.

2. A method according to claim 1, wherein the step of analyzing the image content of the frame in the environment of a block boundary comprises the substep of determining a difference of pixel values across said block boundary, and the step of selecting a certain number of pixels for examination comprises the substep of selecting a number of pixels for examination depending on the determined difference of pixel values across said block boundary.

3. A method according to claim 2, wherein the substep of determining a difference of pixel values across said block boundary comprises the sub-substep of calculating a value $\Delta = |r_1 - l_1|$, where $r_1$ is the value of the pixel on a first side of said block boundary closest to the boundary, and $l_1$ is the value of the pixel on a second side of said block boundary closest to the boundary.

4. A method according to claim 3, wherein the step analyzing the image content of the frame in the environment of a block boundary comprises the substep of determining the size of the quantization step of the transformation coefficients used in the transformation coding of the blocks, and the step of selecting a certain number of pixels for examination comprises the substep of selecting a number of pixels for examination at least partly depending on the determined size of the quantization step of the transformation coefficients used in the transformation coding of the blocks.

5. A method according to claim 4, wherein the number of pixels selected for examination is determined by the formula $$n = \begin{cases} 0 & \Delta \geq 2.00\alpha \\ 1 & 1.50\alpha \leq \Delta < 2.00\alpha \\ 2 & 1.00\alpha \leq \Delta < 1.50\alpha \\ 3 & 0.66\alpha \leq \Delta < 1.00\alpha \\ 4 & 0.40\alpha \leq \Delta < 0.66\alpha \\ 5 & 0.25\alpha \leq \Delta < 0.40\alpha \\ 6 & 0 \leq \Delta < 0.25\alpha \end{cases} \quad (2)$$

wherein n is the number of pixels selected for examination, $\alpha$QP·log(QP) and QP is the size of the quantization step of the transformation coefficients used in the transformation coding of the blocks.

6. A method according to claim 1, additionally comprising the steps of selecting certain pixels to be filtered from the pixels selected for examination, setting a filtering window around each pixel to be filtered, and determining a new value for each pixel to be filtered on the basis of pixels that appear in the filtering window set around the pixel.

7. A method according to claim 6, wherein the new value of the pixel to be filtered is the mean value of the pixels that appear in the filtering window.

8. A method according to claim 6, wherein the step of setting a filtering window around each pixel to be filtered comprises the substeps of determining the size of the filtering window on the first side of said block boundary by the table

| $d_r$ ($d_l > 1$) | $r_1$ | $r_2$ | $r_3$ |
|---|---|---|---|
| 1 | X | X | X |
| 2 | 1 | X | X |
| 3 | 1 | 1 | X |
| 4 | 2 | 2 | X |
| 5 | 2 | 2 | 2 |
| 6 | 3 or 2 | 3 | 3 | wherein an integer parameter dr indicates activity on said first side of the block boundary, an integer parameter $d_l$ indicates activity on the second side of the block boundary, $r_1$, $r_2$ and $r_3$ are the three pixels on the first side of the block boundary closest to the boundary in this order, X means that the pixel is not filtered, a number means that in addition to the pixel to be filtered, a quantity of pixels shown by the number are taken to the filtering window from both sides of the pixel to be filtered, and "3 or 2" means "3, if $d_l > 2$, otherwise 2"; and determining the size of the filtering window on the second side of said block boundary similarly with the exception that all r's are replaced by l's and vice versa.

9. A method according to claim 8, additionally comprising the steps of determining the value of the parameter $d_r$ according to the formula $d_r = 6$, if $|r_i - r_j| \leq \beta/j$ with all $j \in [1,6]$, otherwise: $dr_r = i$, where i must meet the conditions $i \in [1, n]$, $|r_1-r_{i+1}|>\beta/i$, and $|r_1-r_j|\leq\beta/j$ with all $j\in[l,i]$ wherein the auxiliary parameter $\beta=4\cdot\log(QP)$ and QP is the size of the quantization step of the transformation coefficients used in transformation coding of the blocks; and determining the value of the parameter $d_1$ according to the same formula with the exception that all r's are replaced by 1's.

10. A method according to claim 1, additionally comprising the step of receiving said digital video signal in a digital television receiver before beginning its decoding.

11. A device for removing blocking artifacts from the frame of a digital video signal, which has been coded by blocks and then decoded, comprising means for analyzing the image content of a frame, means for selecting pixels from the decoded digital video signal for examination and filtering and a filter for correcting the value of pixels selected for examination and filtering;

wherein said means for selecting pixels for examination and filtering are arranged to operate adaptively according to the analyzed image content of the frame.

12. A device according to claim 11, further comprising programmable means for selecting pixels from the frame as the pixels to be examined, programmable means for selecting the pixels to be filtered from among the pixels to be examined, and programmable means for determining the new value of the pixels to be filtered.

13. The device according to claim 11 wherein the means for selecting pixels for examination and filtering are adapted to select a number of pixels from both sides of a block boundary of the frame.

* * * * *